United States Patent [19]

Hiramatsu

[11] Patent Number: 5,596,559
[45] Date of Patent: Jan. 21, 1997

[54] INFORMATION REPRODUCING APPARATUS FOR REPRODUCING DIGITAL INFORMATION BY SELF-CLOCK SCHEME

[75] Inventor: Makoto Hiramatsu, Kawasaki, Japan

[73] Assignee: Canon Kabushiki Kaisha, Tokyo, Japan

[21] Appl. No.: 421,868

[22] Filed: Apr. 14, 1995

[30] Foreign Application Priority Data

Apr. 20, 1994 [JP] Japan .................................. 6-081638

[51] Int. Cl.$^6$ ............................................ G11B 7/00
[52] U.S. Cl. .............................. 369/59; 369/49; 369/124; 360/51; 360/46; 360/65
[58] Field of Search ............................. 369/59, 50, 47, 369/48, 49, 124; 360/51, 46, 65, 36.1

[56] References Cited

U.S. PATENT DOCUMENTS

| | | | |
|---|---|---|---|
| 4,912,573 | 3/1990 | Murabayashi et al. | 360/51 |
| 5,166,806 | 11/1992 | Ebisawa et al. | 360/36.1 X |
| 5,166,955 | 11/1992 | Ohta | 360/65 X |
| 5,255,128 | 10/1993 | Inoue et al. | 360/46 |

*Primary Examiner*—Muhammad N. Edun
*Attorney, Agent, or Firm*—Fitzpatrick, Cella, Harper & Scinto

[57] ABSTRACT

An information reproducing apparatus includes a reproduction clock generating device for generating a reproduction clock on the basis of a multivalue signal of a reproduction signal reproduced from an information recording medium, and a reproduction data detecting device for detecting the multivalue signal by using the reproduction clock, and for generating reproduction data synchronized with the reproduction clock. The apparatus further includes a first waveform equalizer for performing waveform equalization of the reproduction signal which is suitable for generation of the reproduction signal, and a second waveform equalizer, arranged independently of the first waveform equalizer, for performing waveform equalization of the reproduction signal which is suitable for detection of the reproduction signal.

4 Claims, 11 Drawing Sheets

(DATA DISTINGUISHING POINT)

$f_b = 1/T_b$ : CLOCK FREQUENCY
$T_b$ : CLOCK PERIOD fb=1/Tb : CLOCK FREQUENCY
Tb : CLOCK PERIOD

INFORMATION REPRODUCING APPARATUS FOR REPRODUCING DIGITAL INFORMATION BY SELF-CLOCK SCHEME

BACKGROUND OF THE INVENTION

1. Field of the Invention

The present invention relates to an information reproducing apparatus for reproducing digital information recorded on an information recording medium and, more particularly, to an information reproducing apparatus for reproducing digital information by a self-clock scheme.

2. Related Background Art

Conventionally, in reproducing digital information from a recording medium, a reproduction clock synchronized with reproduction data is extracted, and the reproduction data is detected by using the obtained reproduction clock. Methods of extracting such a reproduction clock include a method of recording clock information on a recording medium in advance independently of recorded information, and extracting a reproduction clock from the clock information, and a method called a self-clock scheme, in which a reproduction clock is extracted from a reproduction signal reproduced from a recording medium.

FIG. 1 is a block diagram showing an information reproducing apparatus of the self-clock scheme. Referring to FIG. 1, a reproduction signal reproduced from a recording medium (such as an optical disk) is amplified by a preamplifier 101. The amplified signal is waveshaped by an equalizer 102 to be converted into a signal waveform allowing detection of data. The waveform-equalized reproduction signal is binarized by a binarizing circuit 103 according to a predetermined slice level to be converted into a binary digital signal. This digital signal is input to a PLL circuit 104 and a data separator 105. The PLL circuit 104 compares the digital signal with a clock signal output from an oscillator (not shown), and adjusts the frequency of the clock signal in accordance with the phase difference between the two signals, thereby extracting a reproduction clock almost synchronized with the digital signal. The data separator 105 detects the digital signal by using the reproduction clock to generate reproduction data perfectly synchronized with the reproduction clock.

It has recently been required for an information recording/reproducing apparatus to perform high-density recording of information. As a method of meeting this requirement, an equalization detection method called partial response equalization has been proposed. A partial response scheme will be described in detail later. According to this scheme, data detection is performed, with intersymbol interference being added, so as to change the frequency characteristics of an equalizer output to that in a narrow band, thereby allowing high-density recording of information. However, in order to realize such a scheme, data must be detected by multivalue detection.

FIG. 2 is a block diagram showing an information reproducing apparatus of such a partial response scheme. Assume that PR (1, 1) is employed for partial response equalization. Referring to FIG. 2, first of all, a reproduction signal is amplified by a preamplifier 111. The signal is then subjected to Nyquist equalization in an equalizer 112. Nyquist equalization is equalization to a Nyquist waveform. A Nyquist waveform is a waveform whose signal level becomes "0" or "1" at a data distinguishing point. An output signal from the equalizer 112 is binarized by a binarizing circuit 113. A PLL circuit 114 extracts a reproduction clock from the binarized digital signal, as in the case shown in FIG. 1.

The output signal from the equalizer 112 is also sent to the equalizer 115 to be subjected to waveform equalization by a partial response. In this case, as described above, since PR (1, 1) is employed for partial response equalization, an equalizer 115 performs signal processing of adding an input signal and a signal delayed by one clock period. The reproduction signal having undergone partial response equalization in the equalizer 115 is compared with two slice level in a binarizing circuit 116 so as to be converted into a ternary signal. A data separator 117 detects the ternary signal by using a reproduction clock to detect the reproduction data.

In the information reproducing apparatus shown in FIGS. 1 and 2, if high-density recording of information is performed, the error rate cannot be reduced. This problem will be described in detail below. Assume that in the apparatus shown in FIG. 1, the equalizer 102 is adjusted to optimize PLL control. That is, the waveform equalization ratio of the equalizer 102 is adjusted such that points (edges) crossing the slice level of the binarizing circuit 103 are present at intervals of an integer multiple of a clock period, and dispersion at a clock point is minimized. If, however, the equalizer 102 is adjusted in accordance with the PLL characteristics, an output signal from the equalizer 102 decreases in the amplitude of a short-period signal, resulting in a reduction in margin in the direction of amplitude. Therefore, resistance to level variations at a low frequency in data detection is reduced, and the error rate cannot be reduced.

Assume that the equalizer 102 is adjusted to increase the amplitude of a short-period signal so as to facilitate data detection. In this case, since the positions of edges are shifted depending on patterns, dispersion at a clock point increases. As a result, PLL control becomes unstable, and the error rate cannot be reduced. As described above, if the equalizer 102 is adjusted to optimize one of the PLL characteristics and the data detection characteristics, the remaining characteristics deteriorate, and the error rate increases.

Assume that in the apparatus using partial response equalization in FIG. 2, PLL control is performed by using an output signal from the equalizer 112 for performing Nyquist equalization. In this case, an output signal from the equalizer 112 has a signal waveform like the one shown in FIG. 3. Similar to the case shown in FIG. 1, edges are shifted depending on patterns, and at a clock point increases. In addition, since the frequency characteristics of the equalizer 112 for performing Nyquist equalization are of a high-frequency emphasis type, the S/N ratio decreases. For this reason, PLL control also becomes unstable, and the error rate increases.

SUMMARY OF THE INVENTION

The present invention has been made in consideration of the above situation, and has as its object to provide an information reproducing apparatus which can stably generate a reproduction clock and sufficiently reduce the error rate.

In order to achieve the above object, there is provided an information reproducing apparatus including reproduction clock generating means for generating a reproduction clock on the basis of a multivalue signal of a reproduction signal reproduced from an information recording medium, and reproduction data detecting means for detecting the multivalue signal by using the reproduction clock, and generating reproduction data synchronized with the reproduction clock, comprising first waveform equalizing means for performing waveform equalization of the reproduction signal, which is suitable for generation of the reproduction clock, and second waveform equalizing means, arranged independently of the first waveform equalizing means, for performing waveform equalization of the reproduction signal, which is suitable for detection of the reproduction data.

The present invention will be described in detail later in conjunction with the following embodiments.

DETAILED DESCRIPTION OF THE PREFERRED EMBODIMENTS

Figure 5:
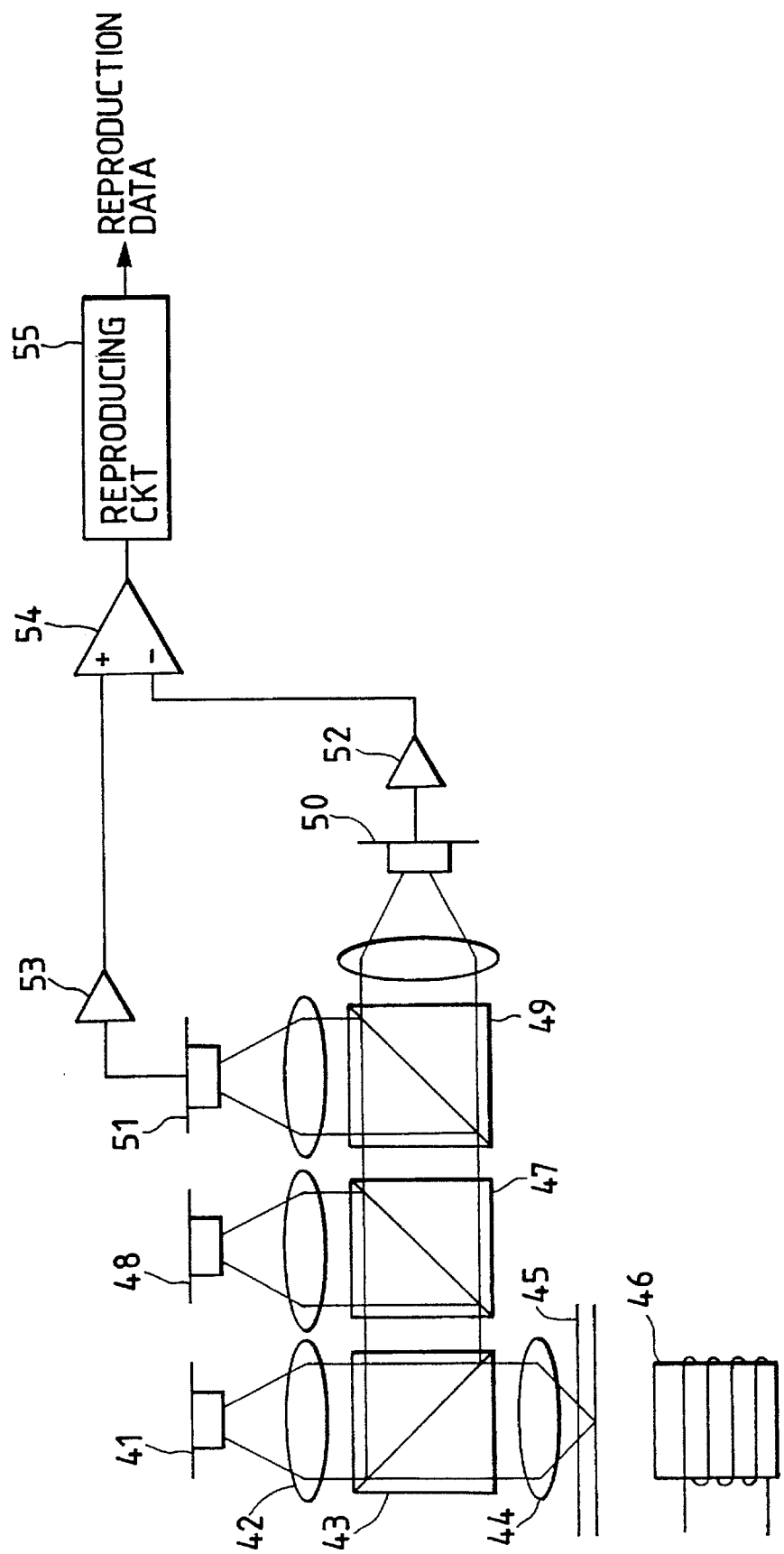
FIG. 5 is a view showing the overall arrangement of a magneto-optical recording/reproducing apparatus according to the present invention.

Embodiments of the present invention will be described in detail below with reference to the accompanying drawings. FIG. 5 shows the overall arrangement of an information reproducing apparatus according to the present invention. This embodiment exemplifies the magneto-optical recording/reproducing apparatus for magneto-optically recording/reproducing information. Referring to FIG. 5, a laser beam emitted from a semiconductor laser 41 as a light source is collimated by a collimator lens 42. The laser beam is then transmitted through a polarization beam splitter 43 to be incident on an objective lens 44. The laser beam is focused by the objective lens 44 to form a small beam spot on a magneto-optical recording medium 45.

In recording information on the magneto-optical recording medium 45, a laser beam having a recording power is irradiated from the semiconductor laser 41 onto the magneto-optical recording medium 45. As a result, a portion of the magneto-optical recording medium 45 irradiated with a beam spot is locally heated. Meanwhile, a magnetic field modulated in accordance with an information signal to be recorded on the magneto-optical recording medium 45 is applied, so that magnetization of the heated portion of the magneto-optical recording medium 45 is oriented in the direction of the applied magnetic field. In this manner, an array of information pits (domains), each having magnetization oriented upward or downward depending on the information signal, are recorded on the magneto-optical recording medium 45, thereby recording a series of information on the magneto-optical recording medium 45.

In reproducing recorded information, a laser beam having a reproduction power at which information cannot be recorded is emitted from the semiconductor laser 41, and the beam spot of this reproduction power is scanned along information tracks of the magneto-optical recording medium 45. In this case, a light beam reflected by the magneto-optical recording medium 45 passes through the objective lens 44 again, is split from the incident light by the polarization beam splitter 43, and is guided to a beam splitter 47. The plane of polarization of the light beam reflected by the magneto-optical recording medium 45 is rotated by the Kerr effect in accordance with recorded information. Part of the incident light is guided to a servo sensor 48 by the beam splitter 47, and the remaining light is guided to the polarization beam splitter 49. In addition, the polarization beam splitter 49 splits the light reflected by the magneto-optical recording medium 45 in accordance with the polarizing direction of the reflected light.

Figure 6:
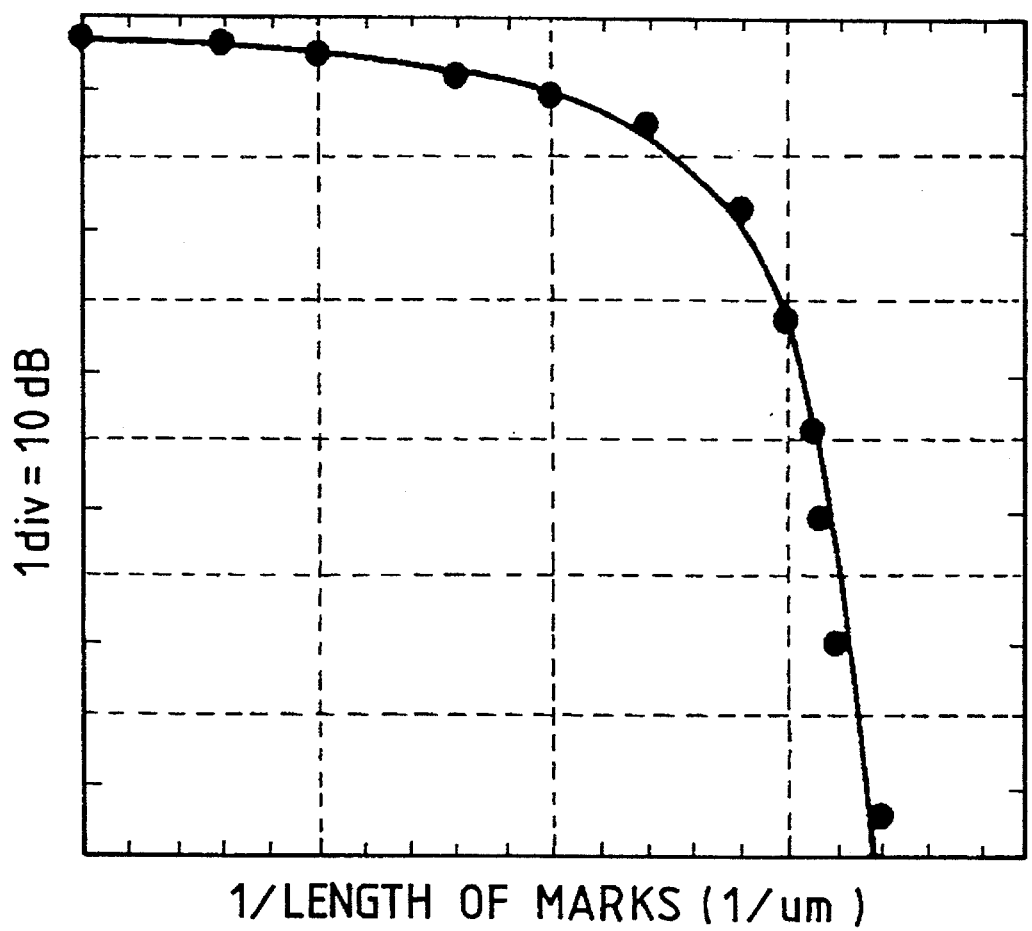
FIG. 6 is a graph showing the frequency characteristics of an output from a differential preamplifier 54 in the magneto-optical recording/reproducing apparatus.

The light beams split by the polarization beam splitter 49 are respectively received by RF sensors 50 and 51, and the respective light-receiving signals are amplified by preamplifiers 52 and 53. The amplified signals are differentially detected by a differential preamplifier 54. As a result, the recorded information is reproduced as a magneto-optical signal. FIG. 6 shows the frequency characteristics of an output from the differential preamplifier 54. As shown in FIG. 6, since a high-frequency component does not extend, a reproduction signal is waveform-equalized by a waveform equalization circuit. The obtained reproduction signal is sent to a reproducing circuit 55, and reproduction data is generated from the reproduction signal, as will be described in detail later. Note that a light-receiving signal received by the servo sensor 48 is supplied to a servo circuit (not shown). The servo circuit then performs tracking control to prevent a beam spot from deviating from an information track of the magneto-optical recording medium 45 in a recording/reproducing operation. In addition, focus control is performed to focus a light beam on a recording layer.

Figure 7:
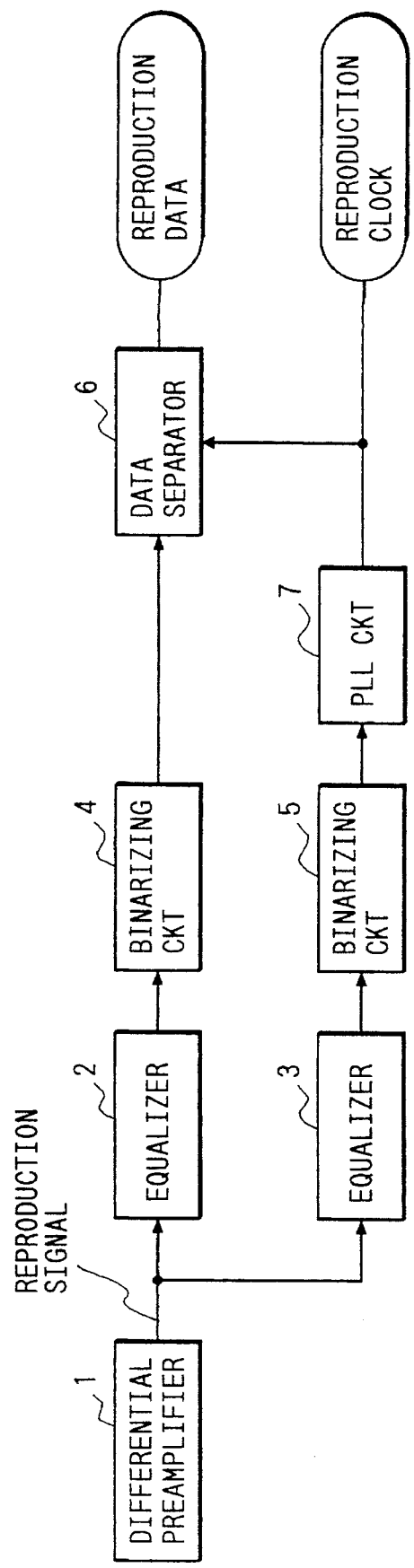
FIG. 7 is a block diagram showing an information reproducing apparatus according to the first embodiment of the present invention.
Figure 8:
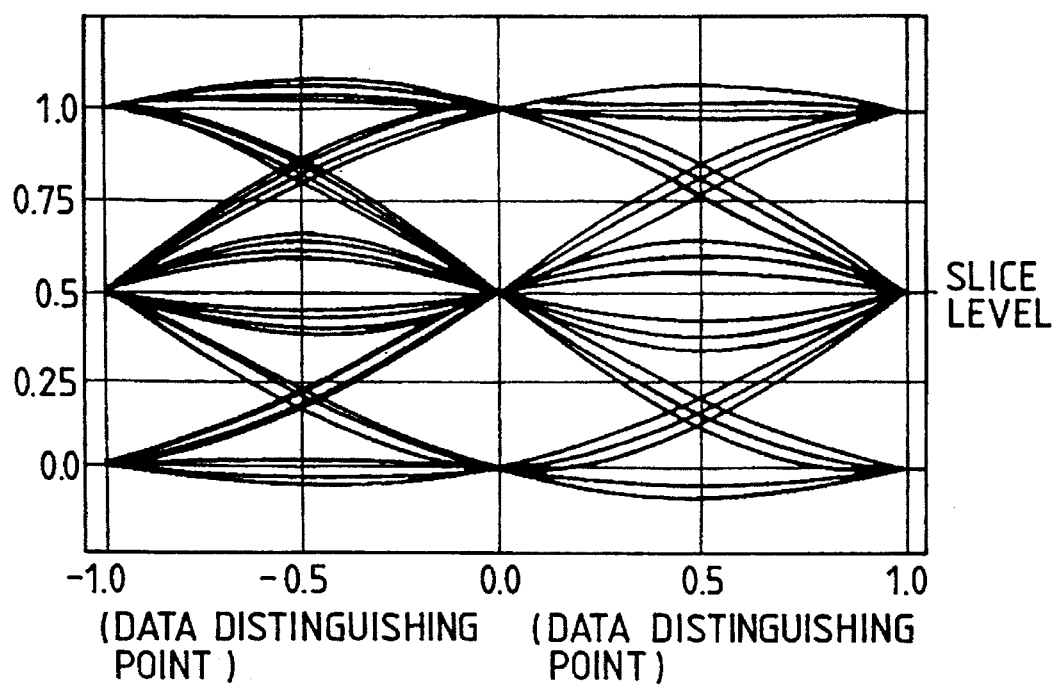
FIG. 8 is a graph showing an output signal from an equalizer 3 for PLL control in the embodiment shown in FIG. 7.

FIG. 7 is a block diagram showing the first embodiment of the present invention. Note that in this embodiment, the present invention is applied to an apparatus of a normal information reproduction scheme (which does not use the partial response scheme). Assume that the circuit shown in FIG. 7 is arranged as the reproducing circuit 55 in the magneto-optical recording/reproducing apparatus shown in FIG. 5. Referring to FIG. 7, a differential preamplifier 1 is identical to the differential preamplifier 54 shown in FIG. 5. When information recorded on the magneto-optical recording medium 45 in FIG. 5 is to be reproduced, a reproduction signal obtained by the differential preamplifier 1 is input to an equalizer 3 for PLL control to optimize waveform equalization for PLL control. FIG. 8 shows a signal waveform after waveform equalization performed by the equalizer 3. Referring to FIG. 8, the abscissa axis is normalized with a clock period $T_b$.

In the equalizer 3, as shown in FIG. 8, waveform equalization is performed such that the edge of a signal waveform after equalization coincides with a clock point (0,0). For this reason, as is apparent, the signal amplitude of a short-period waveform is considerably reduced. The output signal from the equalizer 3 is output to a binarizing circuit 5 to be compared with the slice level shown in FIG. 8. As a result, the signal is converted into a binary digital signal. A PLL circuit 7 compares the phase of a digital signal with that of a clock from an oscillator (not shown). By adjusting the clock frequency of the oscillator in accordance with the phase difference, a reproduction clock is generated. As described above, since waveform equalization is performed by the equalizer 3 such that the edge of a signal waveform coincides with a clock point, dispersion (jitter) of edge positions is reduced. As a result, good PLL characteristics can be obtained, and a stable reproduction clock can be obtained.

Figure 9:
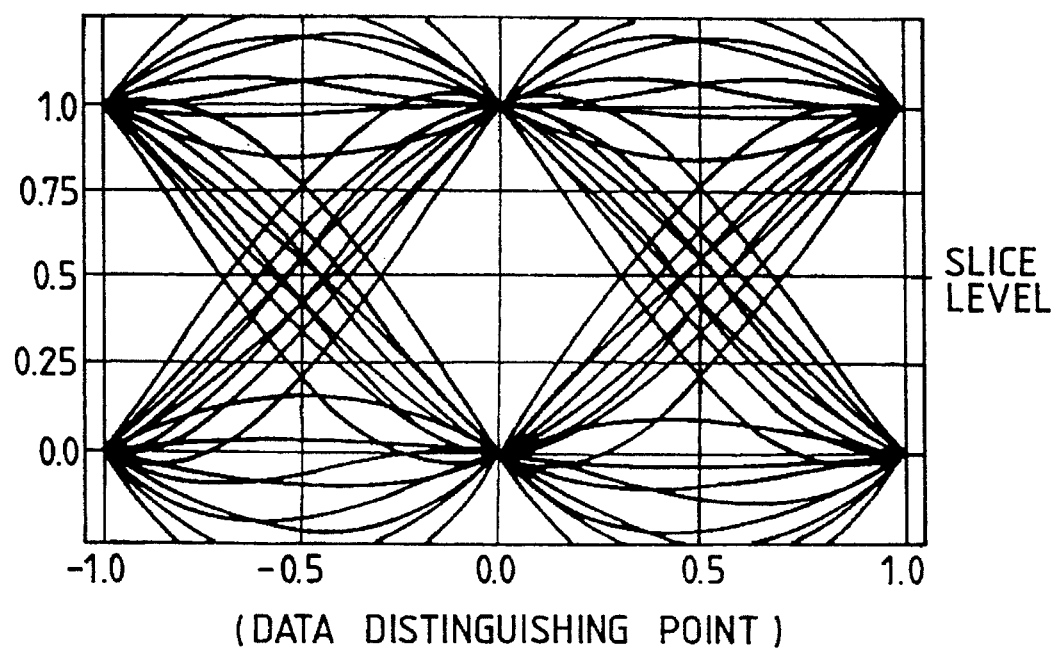
FIG. 9 is a graph showing an output signal from an equalizer 2 for data detection in the embodiment shown in FIG. 7.

In addition, a reproduction signal from the differential preamplifier 1 is subjected to waveform equalization optimal for data detection in an equalizer 2 for data detection. FIG. 9 shows a signal waveform after waveform equalization performed by the equalizer 2. Referring to FIG. 9, the abscissa axis is normalized with the clock period $T_b$, as in FIG. 8. In the equalizer 2, as shown in FIG. 9, waveform equalization is performed such that a signal waveform after equalization becomes "0" or "1" at a data distinguishing point. For this reason, as is apparent, the position of the edge of a signal is shifted depending on reproduction patterns. The output signal from the equalizer 2 is output to a binarizing circuit 4 to be compared with the slice level shown in FIG. 9. As a result, the signal is converted into a binary digital signal. A data separator 6 performs detection at a data distinguishing point by using a reproduction clock from the PLL circuit 7 so as to generate reproduction data. As described above, since waveform equalization is performed by the equalizer 2 such that a signal waveform becomes "0" or "1" at a data distinguishing point, a reproduction signal has a sufficient amplitude difference. Therefore, in data detection, resistance to level variations is high, and the error rate can be sufficiently reduced.

Figure 10:
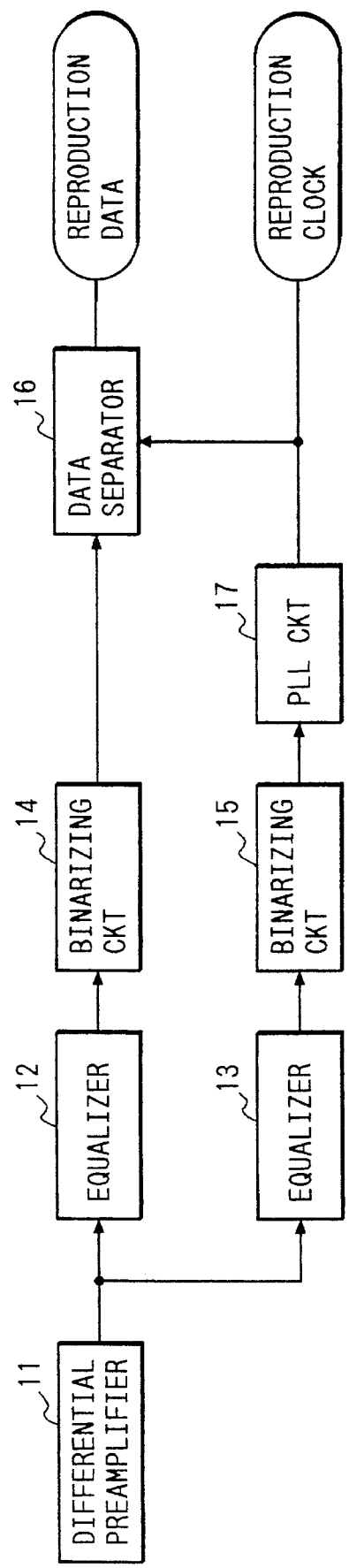
FIG. 10 is a block diagram showing the second embodiment of the present invention.
Figure 11:
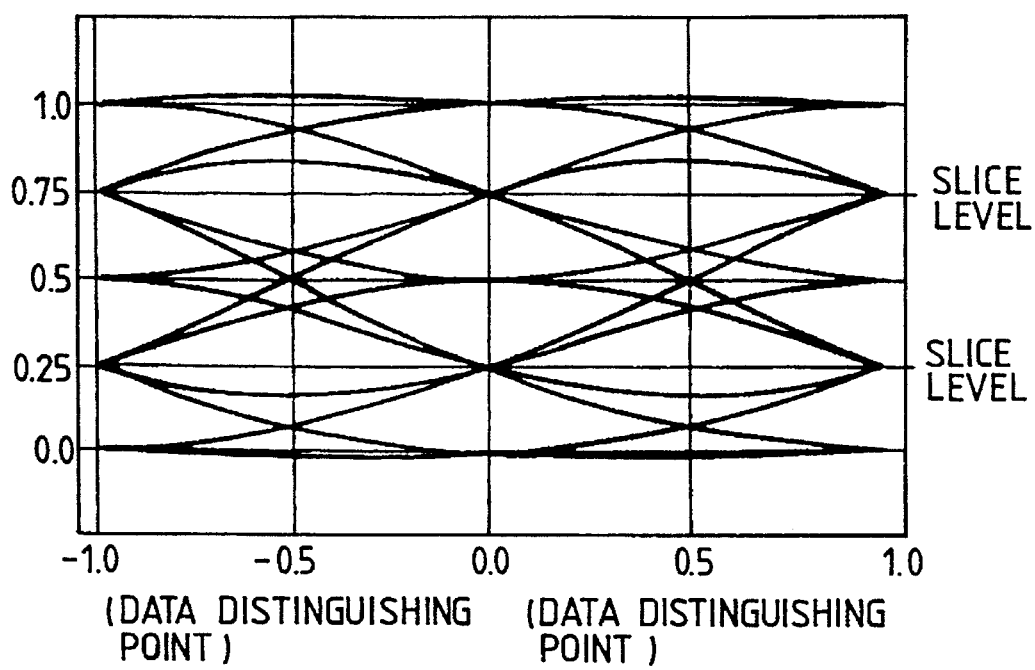
FIG. 11 is a graph showing an output signal from an equalizer 13 for PLL control in the embodiment shown in FIG. 10.
Figure 12:
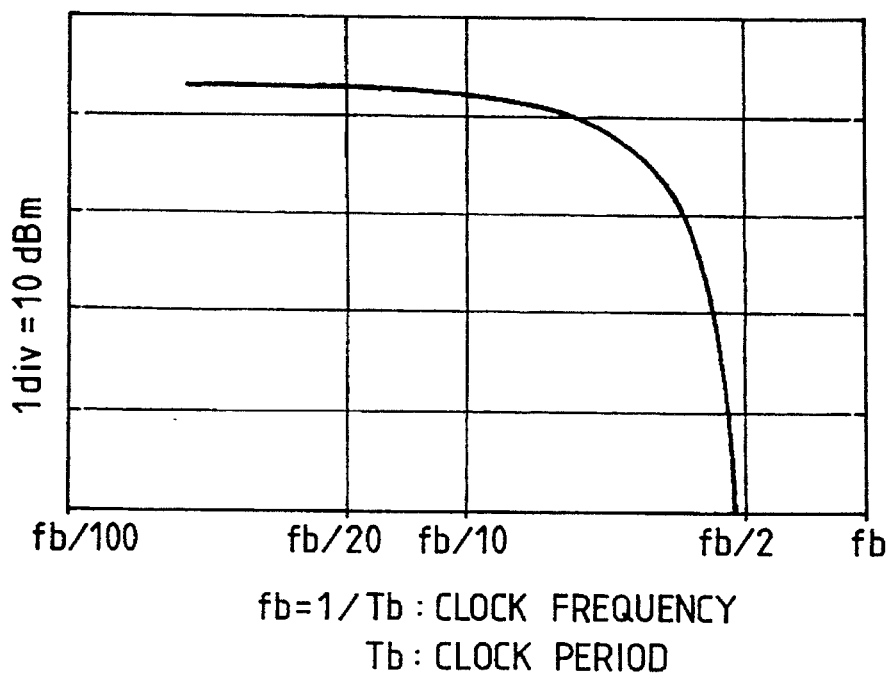
FIG. 12 is a graph showing the frequency characteristics of an output from the equalizer 13 for PLL control in the embodiment shown in FIG. 10.

FIG. 10 is a block diagram showing the second embodiment of the present invention. In this embodiment, the present invention is applied to an apparatus using partial response equalization. Assume that the reproducing circuit in FIG. 10 is arranged as the reproducing circuit 55 in the magneto-optical recording/reproducing apparatus shown in FIG. 5. Referring to FIG. 10, a differential preamplifier 11 is identical to the differential preamplifier 54 in FIG. 5. A reproduction signal obtained by the differential preamplifier 11 is input to an equalizer 13 for PLL control to perform optimal waveform equalization for PLL control. Note that partial response equalization PR (1, 2, 1) characteristics are employed for waveform equalization. FIG. 11 shows a signal waveform after waveform equalization performed by the equalizer 13. FIG. 12 shows the frequency characteristics of an output signal from the equalizer 13. Referring to FIG. 11, the abscissa axis is normalized with a clock period $T_b$. The equalizer 13 performs waveform equalization such that the edge of a reproduction signal, which crosses two slice levels, coincides with a clock point (0,0), as shown in FIG. 11.

Figure 1:
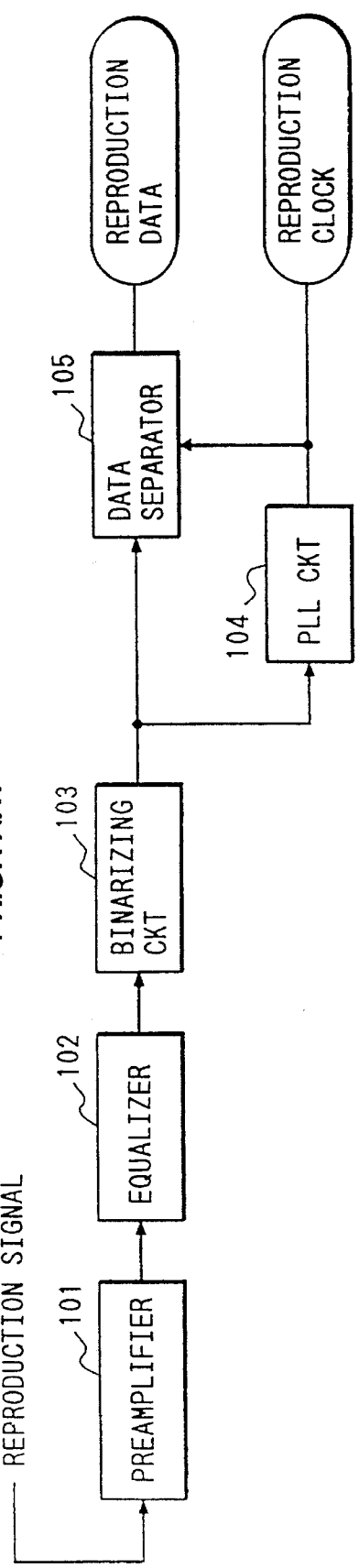
FIG. 1 is a block diagram showing a conventional information reproducing apparatus of a self-clock scheme.
Figure 2:
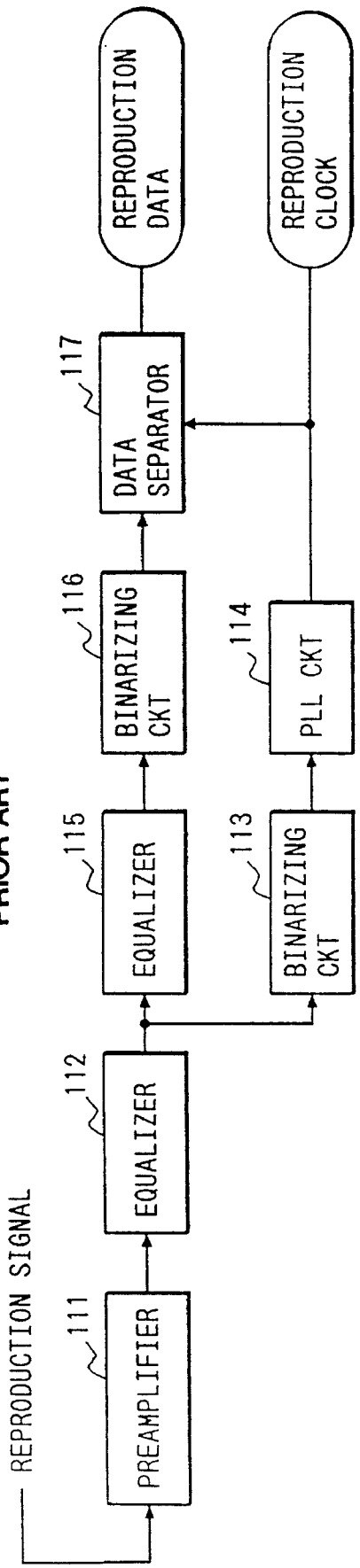
FIG. 2 is a block diagram showing a conventional information reproducing apparatus using partial response equalization.
Figure 3:
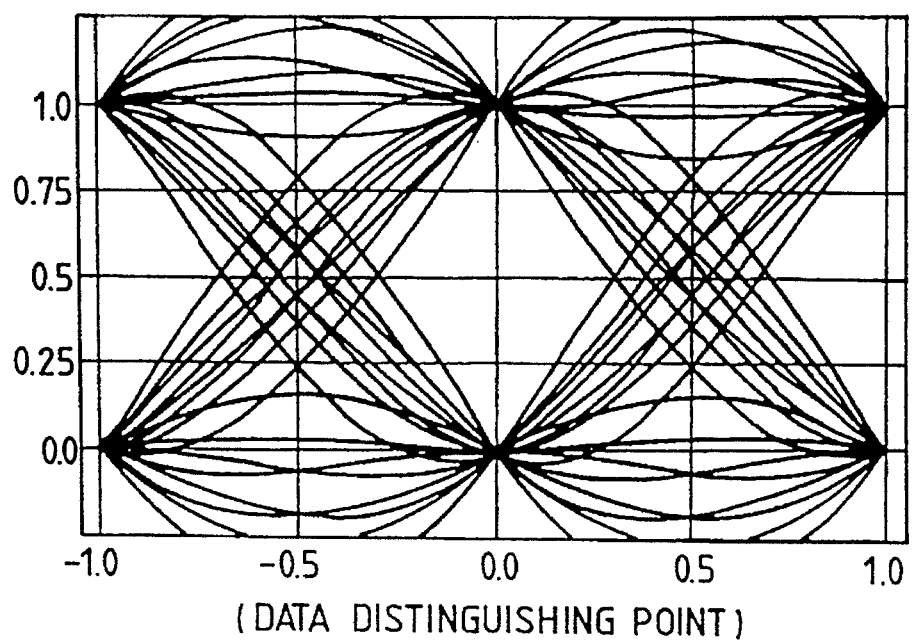
FIG. 3 is a graph showing a Nyquist-waveform-equalized signal from an equalizer 112 of the apparatus shown in FIG. 2.
Figure 4:
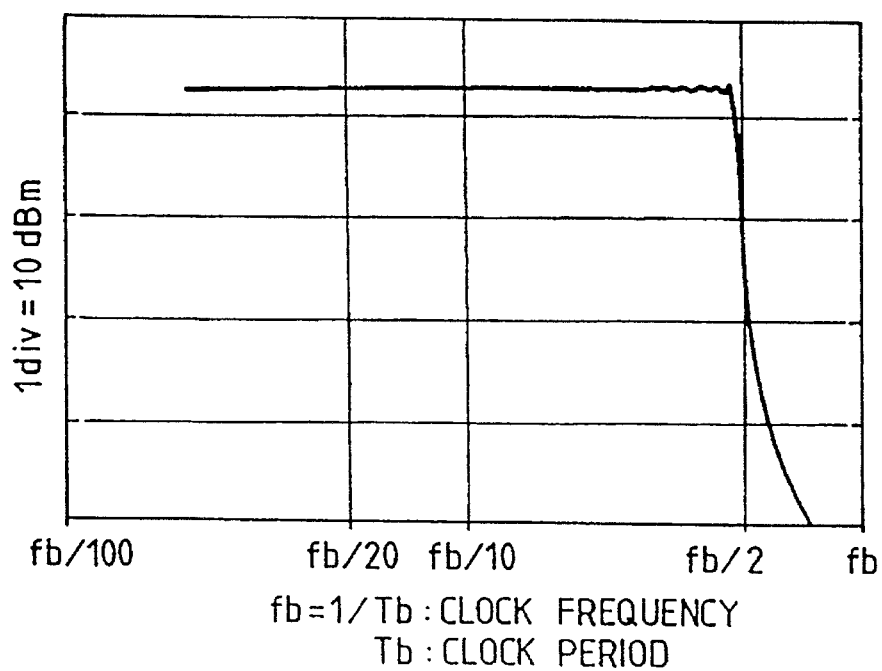
FIG. 4 is a graph showing the frequency characteristics of the equalizer 112 of the apparatus shown in FIG. 2.

As is apparent from FIG. 12, the frequency characteristics of an output signal from the equalizer 13 have a lower intensity of a high-frequency component than that of the Nyquist waveform shown in FIG. 4. Therefore, the S/N ratio can be increased. The output signal from the equalizer 13 is input to a binarizing circuit 15, in which the signal is compared with the two slice levels shown in FIG. 11 to be converted into a digital signal. A PLL circuit 17 compares the phase of the digital signal with that of a clock from an oscillator (not shown), and adjusts the clock frequency in accordance with the phase difference, thereby generating a reproduction clock. As described above, since waveform equalization is performed by the equalizer 13 such that the edge of a signal waveform coincides with a clock point, dispersion of edge positions is reduced, as in the first embodiment. As a result, good PLL characteristics can be obtained, and a stable reproduction clock can be obtained.

Figure 13:
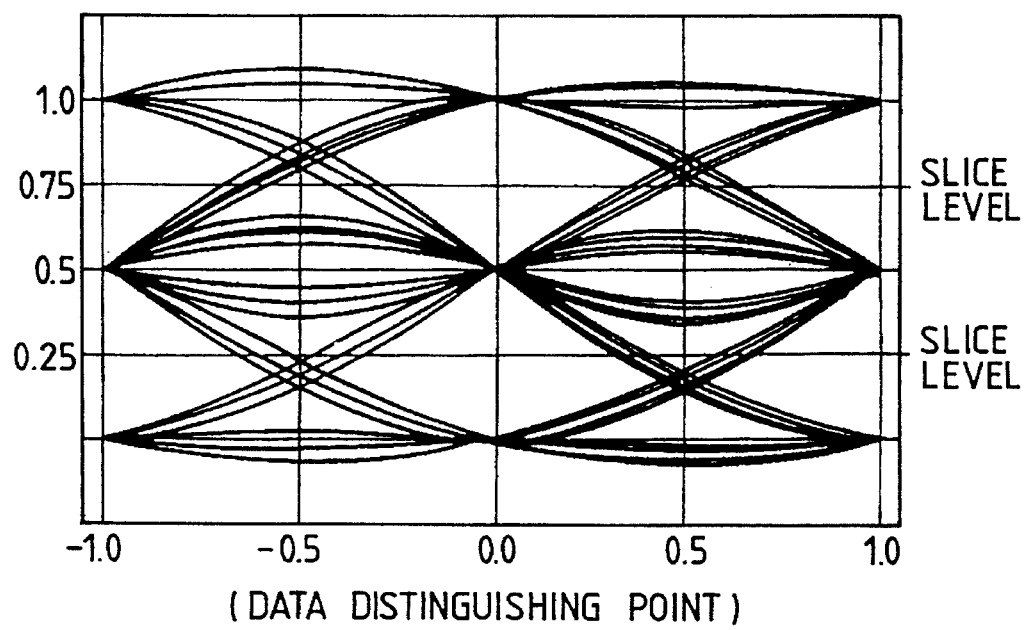
FIG. 13 is a graph showing an output signal from the equalizer 12 for data detection in the embodiment shown in FIG. 10.
Figure 14:
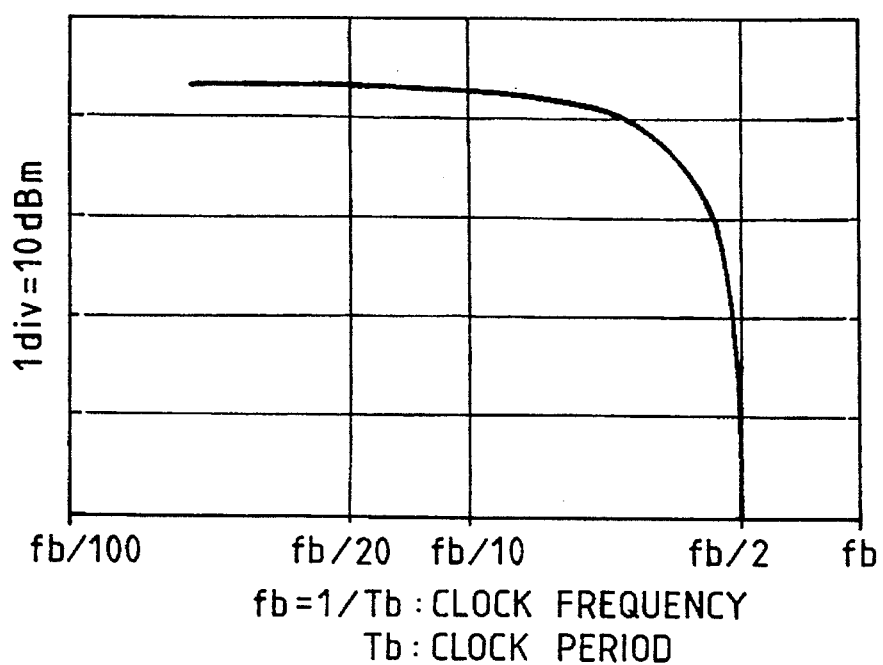
FIG. 14 is a graph showing the frequency characteristics of an output from the equalizer 12 for data detection in the embodiment shown in FIG. 10.

A reproduction signal from the differential preamplifier 11 is input to an equalizer 12 for data detection and undergoes optimal waveform equalization for data detection. Assume that partial response equalization PR (1, 1) characteristics are employed for waveform equalization. FIG. 13 shows a signal waveform after waveform equalization performed by the equalizer 12. FIG. 14 shows the frequency characteristics of an output signal from the equalizer 12. The equalizer 12 performs waveform equalization such that a signal waveform after waveform equalization becomes "0", "0.5", or "1" at a data distinguishing point, i.e., a ternary value of "0", "1", or "2", as shown in FIG. 13. For this reason, as is apparent, the positions of edges of signals are shifted depending on reproduction patterns. The output signal from the equalizer 12 is output to a binarizing circuit 14, in which the signal is compared with the two slice levels shown in FIG. 13 to be converted into a ternary digital signal. The obtained digital signal is output to a data separator 16. The data separator 16 performs detection at a data distinguishing point by using a reproduction clock so as to generate reproduction data. As described above, in this embodiment as well, a signal waveform becomes "0", "1", or "2" at a data distinguishing point in the equalizer 12, and the signal has a sufficient amplitude difference. Therefore, in data detection, resistance to level variations is high, and the error rate can be sufficiently reduced.

Figure 15:
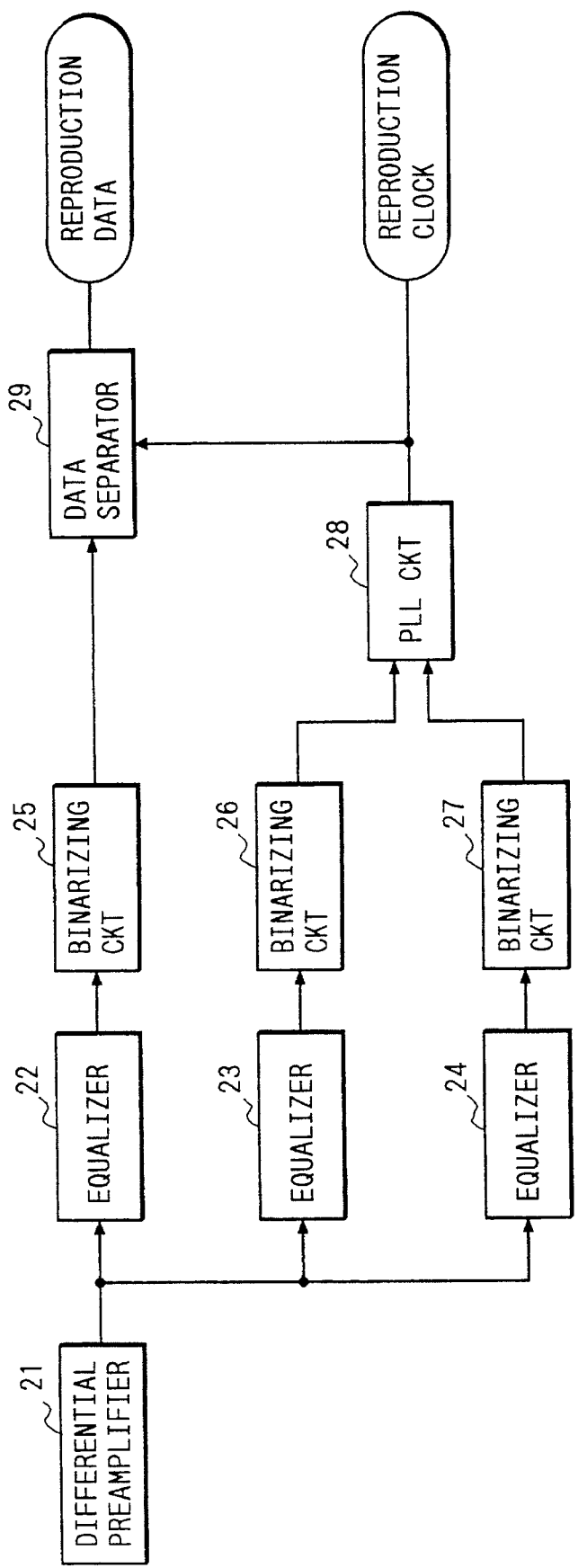
FIG. 15 is a block diagram showing the third embodiment of the present invention.

FIG. 15 is a block diagram showing the third embodiment of the present invention. In this embodiment, the present invention is applied to an apparatus designed to perform PLL control separately at the leading and trailing edges of a reproduction signal in an apparatus of a general information reproduction scheme (a scheme using no partial response equalization). Assume that the circuit shown in FIG. 15 is arranged as a reproducing circuit 55 in the magneto-optical recording/reproducing apparatus shown in FIG. 5. Referring to FIG. 15, a differential preamplifier 21 is identical to the differential preamplifier 54 in FIG. 5. A reproduction signal obtained by the differential preamplifier 21 is output to an equalizer 23 for leading edge PLL control and an equalizer 24 for trailing edge PLL control so as to be subjected to optimal waveform equalization for the respective PLL control operations. In this case, since a reproduction signal exhibits asymmetry at its leading and trailing edges, PLL control is separately performed at the leading and trailing edges.

More specifically, the equalizer 23 performs waveform equalization such that the leading edge of a signal waveform after waveform equalization coincides with a clock point. A binarizing circuit 26 compares this signal with a slice level to convert the signal into a binary digital signal. In addition, the equalizer 24 performs waveform equalization such that the trailing edge of the signal waveform after waveform equalization coincides with a clock point. A binarizing circuit 27 compares this signal with the slice level to convert the signal into a binary digital signal. The digital signals indicating the leading and trailing edges, which are respectively obtained by the binarizing circuits 26 and 27, are output to a PLL circuit 28. The PLL circuit 28 compares the phase of each input digital signal with that of a clock from an oscillator (not shown), and adjusts the clock frequency of the oscillator in accordance with the phase difference, thereby generating a reproduction clock. In this embodiment, since the leading edge of a signal waveform from the equalizer 23 and the trailing edge of a signal waveform from the equalizer 24 coincide with a clock point, dispersion of edge positions is reduced. Therefore, good PLL characteristics can be obtained, and a stable reproduction clock can be obtained.

A reproduction signal from the differential preamplifier 21 is output to an equalizer 22 to be subjected to optimal waveform equalization for data detection. That is, the equalizer 22 performs waveform equalization such that a signal waveform after waveform equalization becomes "0" or "1" at a data distinguishing point. The equalizer 23 compares this signal after waveform equalization with a slice level to convert the signal into a binary digital signal. The obtained digital signal is output to a data separator 29, in which detection is performed at a data distinguishing point by using a reproduction clock from the PLL circuit 28, thereby generating reproduction data. In this embodiment as well, a signal waveform obtained by the equalizer 22 becomes "0" or "1" at a data distinguishing point, and hence the signal has a sufficient amplitude difference. Therefore, in data detection, resistance to level variations is high, and the error rate can be sufficiently reduced.

Figure 16:
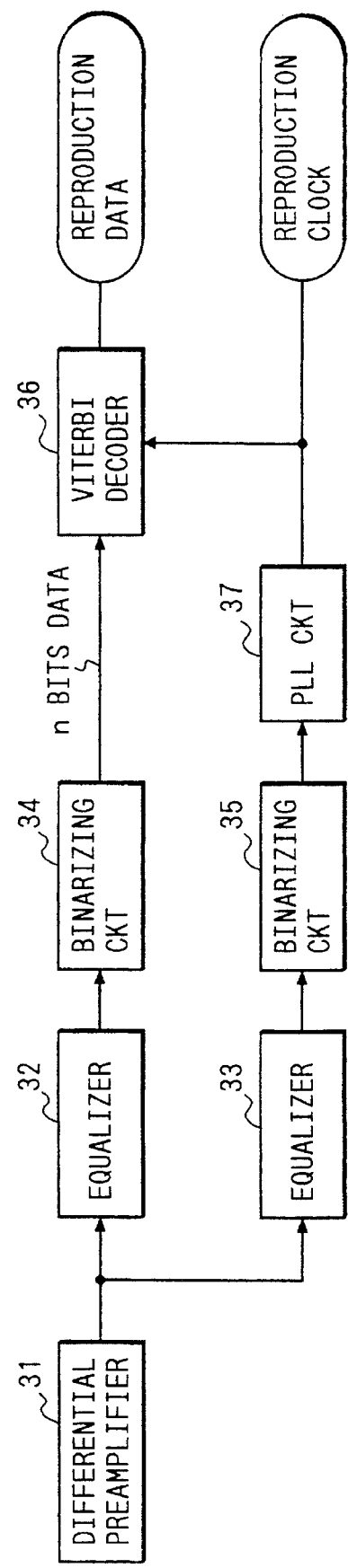
FIG. 16 is a block diagram Showing the fourth embodiment of the present invention.

FIG. 16 is a block diagram showing the fourth embodiment of the present invention. In this embodiment, the present invention is applied to an apparatus using partial response equalization, which is designed to reproduce information by digital signal processing. Assume that the reproducing circuit in FIG. 16 is arranged as the reproducing circuit 55 in the magneto-optical recording/reproducing apparatus in FIG. 5. Referring to FIG. 16, a differential preamplifier 31 is identical to the differential preamplifier 54 in FIG. 5. A reproduction signal obtained by the differential preamplifier 31 is output to an equalizer 33 for PLL control to be subjected to optimal waveform equalization for PLL control. In this case, similar to the embodiment shown in FIG. 10, partial response equalization PR (1, 2, 1) characteristics are employed for waveform equalization. The equalizer 33 performs waveform equalization in the same manner as the equalizer 13 in FIG. 10. The output signal from the equalizer 33 is compared with a slice level by a binarizing circuit 35 to be converted into a digital signal. A PLL circuit 37 then compares the phase of this signal with that of a clock, and adjusts the clock frequency in accordance with the phase difference, thereby generating a reproduction clock.

A reproduction signal from the differential preamplifier 31 is output to an equalizer 32 for data detection to be subjected to optimal waveform equalization for data detection. In this case, as in the equalizer 12 in FIG. 10, partial response equalization (1, 1) characteristics are employed for waveform equalization. Similar to the equalizer 12 in FIG. 10, the equalizer 32 performs waveform equalization such that a signal waveform after waveform equalization becomes "0", "1", or "2" at a data distinguishing point. The output signal from the equalizer 32 is output to an A/D converter 34 to be converted into n-bit digital data. The n-bit digital data is then output to a viterbi decoder 36. In the viterbi decoder 36, detection is performed at a data distinguishing point by using a reproduction clock from the PLL circuit 37 to generate reproduction data. As described above, even in the case wherein information is reproduced by digital signal processing, in data detection, resistance to level variations is high, and the error rate can be sufficiently reduced.

As has been described above, the present invention includes both an equalizer for PLL control, which performs waveform equalization of a reproduction signal, which is suitable for PLL control, and an equalizer for data detection, which performs waveform equalization of a reproduction signal, which is suitable for data detection. These equalizers separately perform waveform equalization depending on purposes. With this operation, in performing high-density recording of information, stable PLL control can be realized, and a satisfactory self-clock scheme can be performed, thereby sufficiently reducing the error rate.

What is claimed is:

1. An information reproducing apparatus including reproduction clock generating means for generating a reproduction clock on the basis of a multivalue signal of a reproduction signal reproduced from an information recording medium, and reproduction data detecting means for detecting the multivalue signal by using the reproduction clock, and generating reproduction data synchronized with the reproduction clock, comprising:

first waveform equalizing means for performing waveform equalization of the reproduction signal, which is suitable for generation of the reproduction clock; and second waveform equalizing means which is provided independently of said first waveform equalizing means and has a waveform equalization characteristic different from that of said first waveform equalizing means, said second waveform equalizing means performing waveform equalization of the reproduction signal, which is suitable for detection of the reproduction data.

2. An apparatus according to claim 1, wherein said reproduction clock generating means is a PLL circuit.

3. An apparatus according to claim 1, wherein said second waveform equalizing means performs partial response waveform equalization.

4. An apparatus according to claim 1, further comprising a path for transmitting the reproduction signal reproduced from the medium, the path being branched into two paths, one of which is connected to said first waveform equalizing means and said reproduction clock generating means, and the other of which is connected to said second waveform equalizing means and said reproduction data detecting means.

* * * * *

UNITED STATES PATENT AND TRADEMARK OFFICE
CERTIFICATE OF CORRECTION

PATENT NO. : 5,596,559
DATED : January 21, 1997
INVENTOR(S) : Hiramatsu

It is certified that error appears in the above-indentified patent and that said Letters Patent is hereby corrected as shown below:

<u>COLUMN 2</u>:

Line 47, "and" should read --and dispersion--.

<u>COLUMN 8</u>:

Line 27, "on" should read --on the--.

Signed and Sealed this

Ninth Day of September, 1997

Attest:

BRUCE LEHMAN

Attesting Officer *Commissioner of Patents and Trademarks*